(12) United States Patent
Woo et al.

(10) Patent No.: US 12,536,999 B2
(45) Date of Patent: Jan. 27, 2026

(54) WEARABLE ELECTRONIC DEVICE AND METHOD FOR CONTROLLING ELECTRONIC DEVICES USING VISION INFORMATION

(71) Applicant: SAMSUNG ELECTRONICS CO., LTD., Suwon-si (KR)

(72) Inventors: Hyunchul Woo, Suwon-si (KR); Gajin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 493 days.

(21) Appl. No.: 17/973,010

(22) Filed: Oct. 25, 2022

(65) Prior Publication Data

US 2023/0138445 A1 May 4, 2023

Related U.S. Application Data

(63) Continuation of application No. PCT/KR2022/013507, filed on Sep. 8, 2022.

(30) Foreign Application Priority Data

Nov. 4, 2021 (KR) .......................... 10-2021-0150845

(51) Int. Cl.
*G10L 15/22* (2006.01)
*G02B 27/01* (2006.01)
(Continued)

(52) U.S. Cl.
CPC .......... *G10L 15/22* (2013.01); *G02B 27/0101* (2013.01); *G02B 27/017* (2013.01);
(Continued)

(58) Field of Classification Search
CPC ................. G10L 15/22; G10L 15/1815; G10L 2015/223; G06V 20/64; G06V 10/82;
(Continued)

(56) References Cited

U.S. PATENT DOCUMENTS 9,442,689 B2 * 9/2016 Chi .......................... G06F 3/013
9,678,654 B2 * 6/2017 Wong ................... G02B 27/017
(Continued)

FOREIGN PATENT DOCUMENTS

JP          6739907        8/2020
KR    10-2015-0085610 A   7/2015
(Continued)

OTHER PUBLICATIONS

PCT International Search Report dated Dec. 21, 2022 for PCT Application No. PCT/KR2022/013507.

*Primary Examiner* — Paras D Shah
*Assistant Examiner* — Nadira Sultana
(74) *Attorney, Agent, or Firm* — Nixon & Vanderhye P.C.

(57) ABSTRACT

An electronic device may include: a camera configured to acquire a current image by capturing an image of an environment around the electronic device; a voice input device configured to receive a user utterance from a user; a processor; and a memory configured to store therein instructions to be executed by the processor, in which, when the instructions are executed by the processor, the processor may be configured to: determine a user's intent based on the received user utterance; determine a target device to be controlled corresponding to the determined intent; and control the determined target device based on the determined intent, and to determine the target device.

10 Claims, 8 Drawing Sheets

(51) Int. Cl.
*G06V 10/82* (2022.01)
*G06V 20/64* (2022.01)
*G10L 15/18* (2013.01)

(52) U.S. Cl.
CPC .............. *G06V 10/82* (2022.01); *G06V 20/64* (2022.01); *G10L 15/1815* (2013.01); *G02B 2027/0138* (2013.01); *G02B 2027/014* (2013.01); *G10L 2015/223* (2013.01)

(58) Field of Classification Search
CPC .............. G02B 27/0101; G02B 27/017; G02B 27/0138; G02B 27/014; G06F 3/017; G06F 3/013
See application file for complete search history.

(56) References Cited

U.S. PATENT DOCUMENTS

| | | | | |
|---|---|---|---|---|
| 10,789,952 | B2 * | 9/2020 | Cartwright | .............. G06F 3/017 |
| 11,508,368 | B2 * | 11/2022 | Suzuki | ................ G06V 20/597 |
| 2016/0274762 | A1 * | 9/2016 | Lopez | ................ G06T 19/006 |
| 2018/0096683 | A1 * | 4/2018 | James | .................... G10L 15/30 |
| 2018/0329662 | A1 * | 11/2018 | Cronin | ................ G02B 27/017 |
| 2019/0281878 | A1 * | 9/2019 | Tang | .................... A61B 5/4866 |
| 2019/0391716 | A1 * | 12/2019 | Badr | ...................... G08C 17/02 |
| 2020/0033599 | A1 | 1/2020 | Zhou et al. | |
| 2020/0053262 | A1 * | 2/2020 | Wexler | .................... G06V 20/30 |
| 2020/0251108 | A1 | 8/2020 | Suzuki et al. | |
| 2021/0151052 | A1 * | 5/2021 | Kang | ...................... G10L 15/22 |
| 2021/0174534 | A1 * | 6/2021 | Yi | ............................ G10L 15/24 |
| 2021/0350624 | A1 * | 11/2021 | Komp | ................... G06T 19/006 |
| 2022/0387130 | A1 * | 12/2022 | Spaas | ..................... A61B 90/36 |
| 2023/0050547 | A1 * | 2/2023 | Nagar | ...................... G06F 3/013 |

FOREIGN PATENT DOCUMENTS

| | | | | |
|---|---|---|---|---|
| KR | 10-2020-0099380 A | | 7/2015 | |
| KR | 20150085610 A | * | 7/2015 | ............. G06F 3/013 |
| KR | 10-1728707 | | 4/2017 | |
| KR | 10-2018-0041642 A | | 4/2018 | |
| KR | 10-2025391 | | 9/2019 | |
| KR | 10-2019-0141109 A | | 12/2019 | |
| KR | 10-2144671 | | 8/2020 | |
| KR | 10-2021-0044506 | | 4/2021 | |
| WO | WO-2020068040 A1 | * | 4/2020 | ......... G06F 3/04847 |

* cited by examiner

WEARABLE ELECTRONIC DEVICE AND METHOD FOR CONTROLLING ELECTRONIC DEVICES USING VISION INFORMATION

CROSS-REFERENCE TO RELATED APPLICATIONS

This application is a continuation of International Application No. PCT/KR2022/013507 designating the United States, filed on Sep. 8, 2022, in the Korean Intellectual Property Receiving Office and claiming priority to Korean Patent Application No. 10-2021-0150845 filed on Nov. 4, 2021, in the Korean Intellectual Property Office, the disclosures of which are hereby incorporated herein by reference herein in their entireties.

BACKGROUND

1. Field

The disclosure relates to a technology for controlling an electronic device using, for example, vision information.

2. Description of Related Art

A wearable device such as augmented reality (AR) glasses may be a next-generation device capable of displaying a virtual image (e.g., information of objects) over a real image currently being viewed by a user. The wearable device may include a camera and a sensor that are configured to recognize an environment therearound, and an optical display configured to analyze information acquired through the camera and the sensor and display a virtual image on a real screen currently being viewed by a user.

The wearable device may provide a user with a voice assistant service that performs a task or service for the user based on a command or query from the user. The wearable device may receive a voice command from a user through a voice input device such as a microphone and understand an intent of the voice command to perform the voice command. For example, a user may utter a voice command for controlling another electronic device and input the uttered voice command to the wearable device through the voice input device, and the wearable device may transmit a control signal to the electronic device according to the voice command to control the electronic device.

SUMMARY

A voice command of a user input to a wearable device for controlling an electronic device may generally include information associated with a target device to be controlled. However, when the user utters a voice command with the information associated with the target device omitted or the target device is not specified by the utterance by the user, the wearable device may not readily perform the voice command.

An aspect of various example embodiments described herein provides a wearable device and/or method for controlling an electronic device using vision information that may specify a target device to be controlled even when the target device to be controlled is not recognized from an utterance uttered by a user to control the electronic device.

However, technical aspects of the present disclosure are not limited to the foregoing aspect, and other technical aspects may also be present. Additional aspects of the disclosure will be set forth in part in the description which follows and, in part, will be apparent from the description, or may be learned by practice of the presented embodiments of the disclosure.

According to an example embodiment, there may be provided an electronic device configured to control an electronic device using vision information, wherein the electronic device may include: a camera configured to acquire a current image by capturing an image of an environment around the electronic device; a voice input device configured to receive a user utterance from a user; a processor comprising processing circuitry; and at least one memory configured to store therein instructions to be executed by the processor. When the instructions are executed by the processor, the processor may be configured to: determine a user's intent based on the received user utterance; determine a target device to be controlled corresponding to the determined intent; and control the determined target device according to the determined intent. To determine the target device, the processor is further configured to: determine whether it is possible to determine the target device from the user utterance; and when it is not possible to determine the target device from the user utterance, determine whether it is possible to determine the target device based on the current image acquired through the camera.

According to an example embodiment, there may be provided a method of controlling an electronic device using vision information, the method including: receiving a user utterance from a user through a voice input device of a wearable electronic device; determining a user's intent based on the received user utterance; determining a target device to be controlled corresponding to the determined intent; and controlling the determined target device based on the determined intent. The determining of the target device may include determining whether it is possible to determine the target device from the user utterance; and when it is not possible to determine the target device from the user utterance, determining whether it is possible to determine the target device based on a current image acquired through a camera configured to acquire the current image by capturing an image of an environment around the wearable electronic device.

According to example embodiments described herein, when a target device to be controlled is not recognized from an utterance uttered by a user to control an electronic device, a wearable device and method for controlling an electronic device using vision information may recognize a space using vision information acquired through a camera of the wearable device and identify an electronic device corresponding to the recognized space to specify the target device to be controlled.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
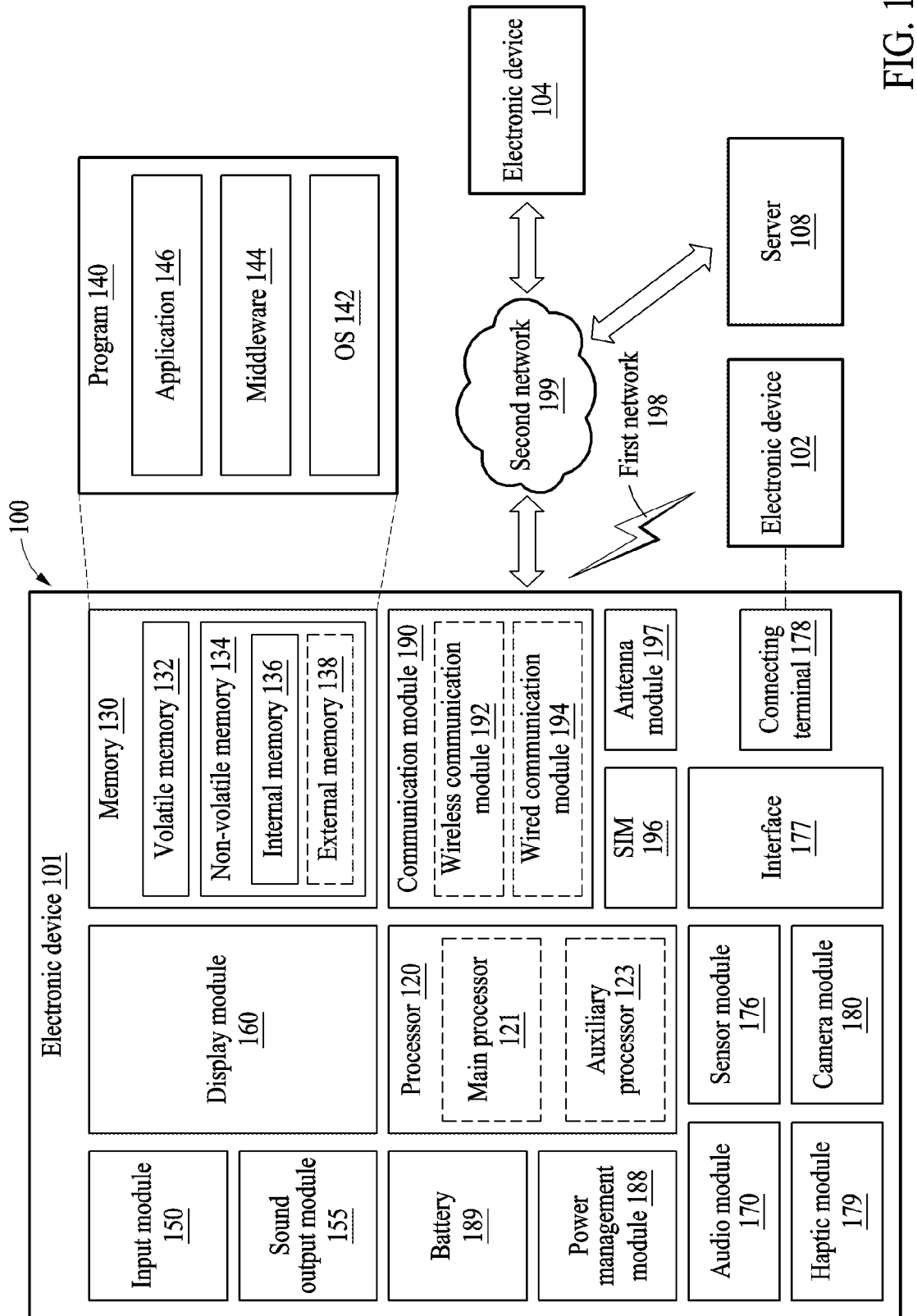
FIG. 1 is a block diagram illustrating an example electronic device in a network environment according to an example embodiment.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to an example embodiment. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the external electronic device 104 via the server 108. According to an example embodiment, the electronic device 101 may include a processor 120 comprising processing circuitry, a memory 130, an input module 150 comprising input circuitry, a sound output module 155, a display module 160 comprising a display, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added to the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected (directly or indirectly) to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160 (including a display), the sensor module 176 (including a sensor), or the communication module 190 (including communication circuitry)) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence (AI) model processing. An AI model may be generated by machine learning. The machine learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry for controlling a corresponding one of the display, the hologram device, and the projector. According to an example embodiment, the display module 160 may include a touch sensor adapted to sense a touch, or a pressure sensor adapted to measure an intensity of a force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192, comprising communication circuitry, may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197, comprising at least one antenna, may transmit and/or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., a bottom surface) of the PCB, or adjacent to the first surface of the PCB and capable of supporting a designated high-frequency band (e.g., a mmWave band), and a plurality of antennas (e.g., array antennas) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 and the electronic device 104) may be a device of the same type as or a different type from the electronic device 101. According to an example embodiment, all or some of operations to be executed by the electronic device 101 may be executed by one or more of the external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 101. The electronic device 101 may provide the result, with or without further processing of the result, as at least a part of a response to the request. To that end, cloud computing, distributed computing, mobile edge computing (MEC), or client-server computing technology may be used, for example. The electronic device 101 may provide ultra-low latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
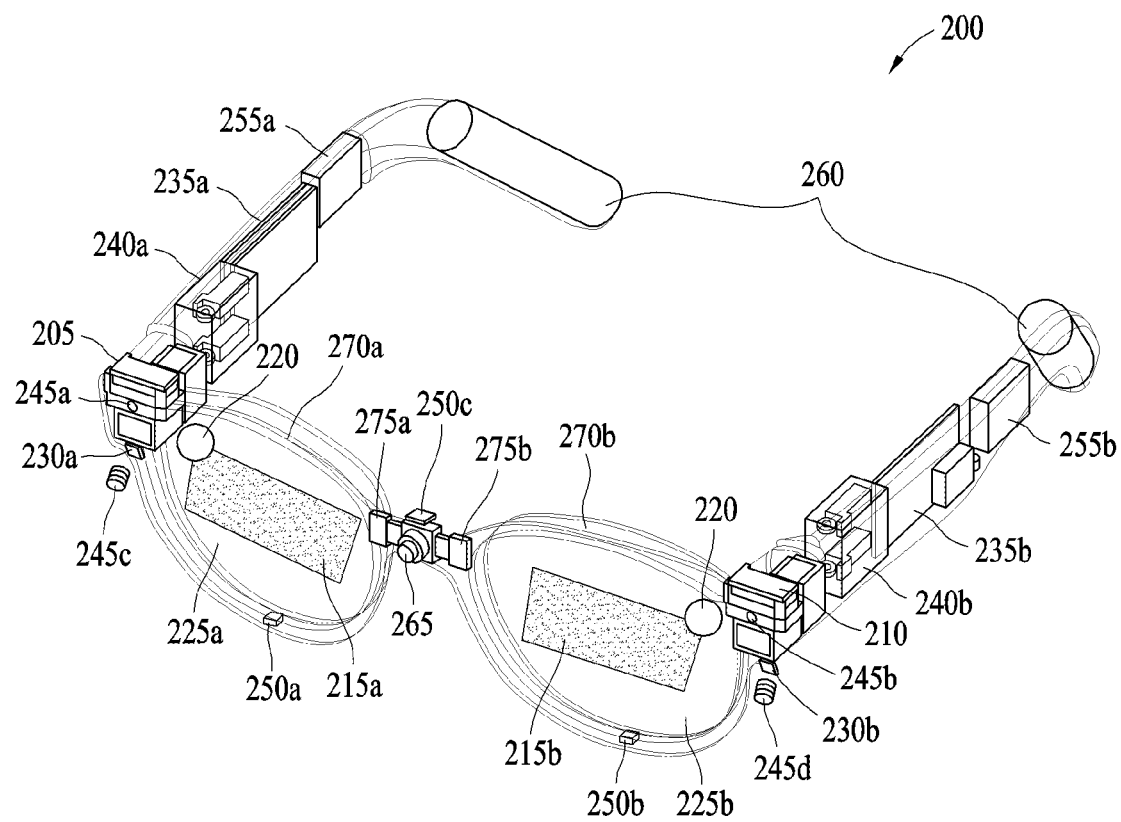
FIG. 2 is a perspective view of an example wearable device according to an example embodiment.

FIG. 2 is a perspective view of an example wearable device according to an example embodiment.

Referring to FIG. 2, a wearable device 200 (e.g., the electronic device 101 of FIG. 1) may be worn on a face of a user to provide the user with an image associated with an augmented reality (AR) and/or virtual reality (VR) service.

In an example embodiment, the wearable device 200 may include a first display 205, a second display 210, screen display portions 215a and 215b, an optical input member 220, a first transparent member 225a, a second transparent member 225b, lighting units 230a and 230b each comprising a light source, a first printed circuit board (PCB) 235a, a second PCB 235b, a first hinge 240a, a second hinge 240b, first cameras camera 245a, 245b, 245c, and 245d, a plurality of microphones (e.g., a first microphone 250a, a second microphone 250b, and a third microphone 250c), a plurality of speakers (e.g., a first speaker 255a and a second speaker 255b), a battery 260, second cameras 275a and 275b, a third camera 265, and visors 270a and 270b.

In an example embodiment, a display (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (micro-LED), or the like. Although not illustrated in the drawings, when the display is one of an LCD, a DMD, and an LCoS, the wearable device 200 may include a light source configured to emit light to a screen output area of the display. In another example embodiment, when the display is configured to generate light by itself, for example, when the display is either an OLED or a micro-LED, the wearable device 200 may provide a virtual image of a relatively high quality to the user even though a light source is not included. For example, when the display is implemented as an OLED or a micro-LED, such a light source may be unnecessary, and accordingly the wearable device 200 may be lightened. The display capable of generating light by itself may be referred to herein as a "self-luminous display," and the following description will be made on the assumption of the self-luminous display.

In an example embodiment, the display (e.g., the first display 205 and the second display 210) may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 µm or less). Accordingly, the display may provide a high resolution without a backlight unit (BLU), when it is implemented by the micro-LED as described above. However, examples are not limited thereto, and a single pixel may include R, G, and B, and a single chip may be implemented by a plurality of pixels including R, G, and B pixels.

In an example embodiment, the display (e.g., the first display 205 and the second display 210) may include a display area including pixels for displaying a virtual image and light-receiving pixels (e.g., photosensor pixels) that are disposed between pixels and configured to receive light reflected from eyes of a user, convert the received light into electrical energy, and output the electrical energy.

In an example embodiment, the wearable device 200 may detect a gaze direction (e.g., a movement of pupils) of the user using the light-receiving pixels. For example, the wearable device 200 may detect and track a gaze direction of a right eye of the user and a gaze direction of a left eye of the user through one or more light-receiving pixels of the first display 205 and one or more light-receiving pixels of the second display 210. The wearable device 200 may determine a central position of a virtual image based on the gaze directions (e.g., directions in which the pupils of the right eye and the left eye of the user gaze) that are detected through the light-receiving pixels.

In an example embodiment, light emitted from the display (e.g., the first display 205 and the second display 210) may reach the screen display portion 215*a* formed on the first transparent member 225*a* that faces the right eye of the user and the screen display portion 215*b* formed on the second transparent member 225*b* that faces the left eye of the user, by passing through a lens (not shown) and a waveguide. For example, the light emitted from the display (e.g., the first display 205 and the second display 210) may be reflected from a grating area formed in the optical input member 220 and the screen display portions 215*a* and 215*b* by passing through the waveguide, and may then be transmitted to the eyes of the user. The first transparent member 225*a* and/or the second transparent member 225*b* may be formed of, for example, a glass plate, a plastic plate, or a polymer, and may be transparently or translucently formed.

In an example embodiment, the lens (not shown) may be disposed in front of the display (e.g., the first display 205 and the second display 210). The lens (not shown) may include a concave and/or convex lens. For example, the lens (not shown) may include a projection lens or a collimation lens.

In an example embodiment, the screen display portions 215*a* and 215*b* or a transparent member (e.g., the first transparent member 225*a* and the second transparent member 225*b*) may include a reflective lens, a lens including the waveguide.

The waveguide may be formed of glass, plastic, or a polymer, and may have a nanopattern formed on one surface of the inside or outside thereof, for example, a grating structure of a polygonal or curved shape. In an example embodiment, light incident on one end of the waveguide may be propagated inside a display waveguide by the nanopattern to be provided to the user. For example, the waveguide formed as a freeform prism may provide the incident light to the user through a reflection mirror. The waveguide may include at least one of a reflective element (e.g., a reflection mirror) and at least one diffractive element (e.g., a diffractive optical element (DOE) or a holographic optical element (HOE)). The waveguide may guide light emitted from the display (e.g., the first display 205 and the second display 210) to the eyes of the user, using the at least one diffractive element or the reflective element included in the waveguide.

In an example embodiment, the diffractive element may include the optical input member 220 and/or an optical output member (not shown). For example, the optical input member 220 may refer to an input grating area, and the optical output member may refer to an output grating area. The input grating area may function as an input end to diffract (or reflect) light output from the display (e.g., the first display 205 and the second display 210) (e.g., a micro-LED) to transmit the light to the transparent member (e.g., the first transparent member 225*a* and the second transparent member 225*b*) of the screen display portions 215*a* and 215*b*. The output grating area may function as an outlet to diffract (or reflect), to the eyes of the user, light transmitted to the transparent member (e.g., the first transparent member 225*a* and the second transparent member 225*b*) of the waveguide.

In an example embodiment, the reflective element may include an optical total reflection element or a total reflection waveguide for total internal reflection (TIR). For example, total reflection or TIR, which is one of schemes for inducing light, may form an angle of incidence such that light (e.g., a virtual image) input through the input grating area is completely or almost completely reflected from a portion (e.g., a specific surface) of the waveguide, to completely or almost completely transmit the light to the output grating area.

In an example embodiment, light emitted from the display (e.g., the first display 205 and the second display 210) may be guided by the waveguide through the optical input member 120. The light traveling in the waveguide may be guided toward the eyes of the user through the optical output member. The screen display portions 215*a* and 215*b* may be determined based on the light emitted toward the eyes of the user.

In an example embodiment, the first cameras 245*a*, 245*b*, 245*c*, and 245*d* may include cameras used for three degrees of freedom (3DoF) and six degrees of freedom (6DoF) head tracking, hand detection and tracking, and gesture and/or spatial recognition. For example, the first cameras 245*a*, 245*b*, 245*c*, and 245*d* may each include a global shutter (GS) camera to detect and track movements of a head or hand.

For example, the first cameras 245*a*, 245*b*, 245*c*, and 245*d* may use a stereo camera for head tracking and spatial recognition, and may use cameras of the same specification and performance. For example, for detection and tracking of a quick hand movement and a fine finger movement, a GS camera exhibiting a favorable performance (e.g., image drag) may be used.

In an example embodiment, the first cameras 245*a*, 245*b*, 245*c*, and 245*d* may use a rolling shutter (RS) camera. The first cameras 245*a*, 245*b*, 245*c*, and 245*d* may perform spatial recognition for 6DoF and a simultaneous localization and mapping (SLAM) function through depth imaging. In addition, the first cameras 245*a*, 245*b*, 245*c*, and 245*d* may perform a user gesture recognition function.

In an example embodiment, the second cameras 275*a* and 275*b* may be used to detect and track the pupils. The second cameras 275*a* and 275*b* may also be referred to as an eye tracking (ET) camera. The second cameras 275*a* and 275*b* may track a gaze direction of the user. Based on the gaze direction of the user, the wearable device 200 may dispose a center of a virtual image projected onto the screen display portions 215*a* and 215*b* at a position depending on a direction in which the pupils of the user gaze.

The second cameras 275*a* and 275*b* for tracking the gaze direction may use a GS camera to detect the pupils and track a quick movement of the pupils. The second cameras 275*a* and 275*b* may be installed for the left eye and the right eye of the user, respectively, and may use cameras of the same performance and specifications.

In an example embodiment, the third camera 265 may be referred to as a "high resolution (HR) camera" or a "photo video (PV) camera," and may include the HR camera. The third camera 165 may include a color camera having functions for acquiring a high-quality image, such as, for example, an automatic focus (AF) function and an optical image stabilizer (OIS). However, examples of the third camera 265 are not limited thereto, and may include a GS camera or an RS camera.

In an example embodiment, at least one sensor (not shown) (e.g., a gyro sensor, an acceleration sensor, a geomagnetic sensor, and/or a gesture sensor), the first cameras 245a, 245b, 245c, and 245d may perform at least one of head tracking for 6DoF, pose estimation and prediction, gesture and/or spatial recognition, and a SLAM function through depth imaging. In another example embodiment, the first cameras 245a, 245b, 245c, and 245d may be classified and used as a camera for head tracking and a camera for hand tracking.

The lighting units 230a and 230b may be used differently according to positions to which the light units 230a and 230b are attached. For example, the lighting units 230a and 230b may be attached around a hinge (e.g., the first hinge 240a and the second hinge 240b) connecting a frame (e.g., a rim) and a temple, or be attached around a first camera (e.g., 245a, 245b, 245c, and 245d) mounted adjacent or proximate to a bridge connecting the frame. For example, when a GS camera is used to capture an image, the lighting units 230a and 230b may be used to supplement a surrounding brightness. For example, the lighting units 230a and 230b may be used in a dark environment or when it is not easy to detect an object to be captured due to a mixture or a reflection of various light sources.

The lighting units 230a and 230b attached around the frame of the wearable device 200 may be used as an auxiliary means for facilitating eye-gaze detection when the pupils are captured using the second cameras 275a and 275b. When the lighting units 230a and 230b are used as the auxiliary means for detecting the gaze direction, they may include an IR LED with an IR light wavelength.

In an example embodiment, a PCB (e.g., the first PCB 235a and the second PCB 235b) may include a processor (not shown) configured to control components of the wearable device 200, a memory (not shown), and a communication module (not shown). The communication module may be configured the same as the communication module 190 (comprising communication circuitry) of FIG. 1, and the description of the communication module 190 provided above with reference to FIG. 1 may be applicable hereto. For example, the communication module may establish a direct (or wired) communication channel or wireless communication channel between the wearable device 200 and an external electronic device, and support communication through the established communication channel. The PCB may transmit an electrical signal to the components included in the wearable device 200.

The communication module (not shown) may include one or more communication processors that are operable independently of the processor and that support direct (e.g., wired) communication or wireless communication. According to an example embodiment, the communication module may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with an external electronic device via a short-range communication network, such as Bluetooth™ wireless-fidelity (Wi-Fi) direct, or infrared data association (IrDA)) or a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other.

The wireless communication module may support a 5G network after a 4G network, and next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., a mmWave band) to achieve, e.g., a high data transmission rate. The wireless communication module may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna.

The wearable device 200 may further include an antenna module (not shown). The antenna module may transmit or receive a signal or power to or from the outside (e.g., an external electronic device) of the wearable device 200. According to an example embodiment, the antenna module may include an antenna including a radiating element including a conductive material or a conductive pattern formed in or on a substrate (e.g., the first PCB 235a and the second PCB 235b). According to an example embodiment, the antenna module may include a plurality of antennas (e.g., an antenna array).

In an example embodiment, a plurality of microphones (e.g., the first microphone 250a, the second microphone 250b, and the third microphone 250c) may process an external sound signal into electrical audio data. The audio data may be used in various ways according to a function (or application) being performed (or executed) in the wearable device 200.

In an example embodiment, a plurality of speakers (e.g., the first speaker 255a and the second speaker 255b) may output audio data received from the communication module or stored in the memory.

In an example embodiment, the battery 260 may be provided as one or more batteries and may supply power to the components included in the wearable device 200.

In an example embodiment, the visors 270a and 270b may adjust a transmitted amount of external light incident on the eyes of the user based on a transmittance. The visors 270a and 270b may be disposed on a front or rear side of the screen display portions 215a and 215b. The front side of the screen display portions 215a and 215b may indicate a direction opposite to a user's side of the user wearing the wearable device 200, and the rear side of the screen display portions 215a and 215b may indicate a direction of the user's side of the user wearing the wearable device 200. The visors 270a and 270b may protect the screen display portions 215a and 215b and adjust the transmitted amount of the external light.

For example, the visors 270a and 270b may each include an electrochromic device that changes in color according to applied power and adjusts the transmittance. Electrochromism refers to a phenomenon in which color changes in response to an occurrence of an oxidation-reduction reaction by applied power. The visors 270a and 270b may adjust the transmittance of the external light using the color change of the electrochromic device.

For example, the visors 270a and 270b may each include a control module and the electrochromic device. The control module may control the electrochromic device to adjust the transmittance of the electrochromic device. Each "module" herein may comprise circuitry.

Each embodiment herein may be used in combination with any other embodiment herein.

Figure 3:
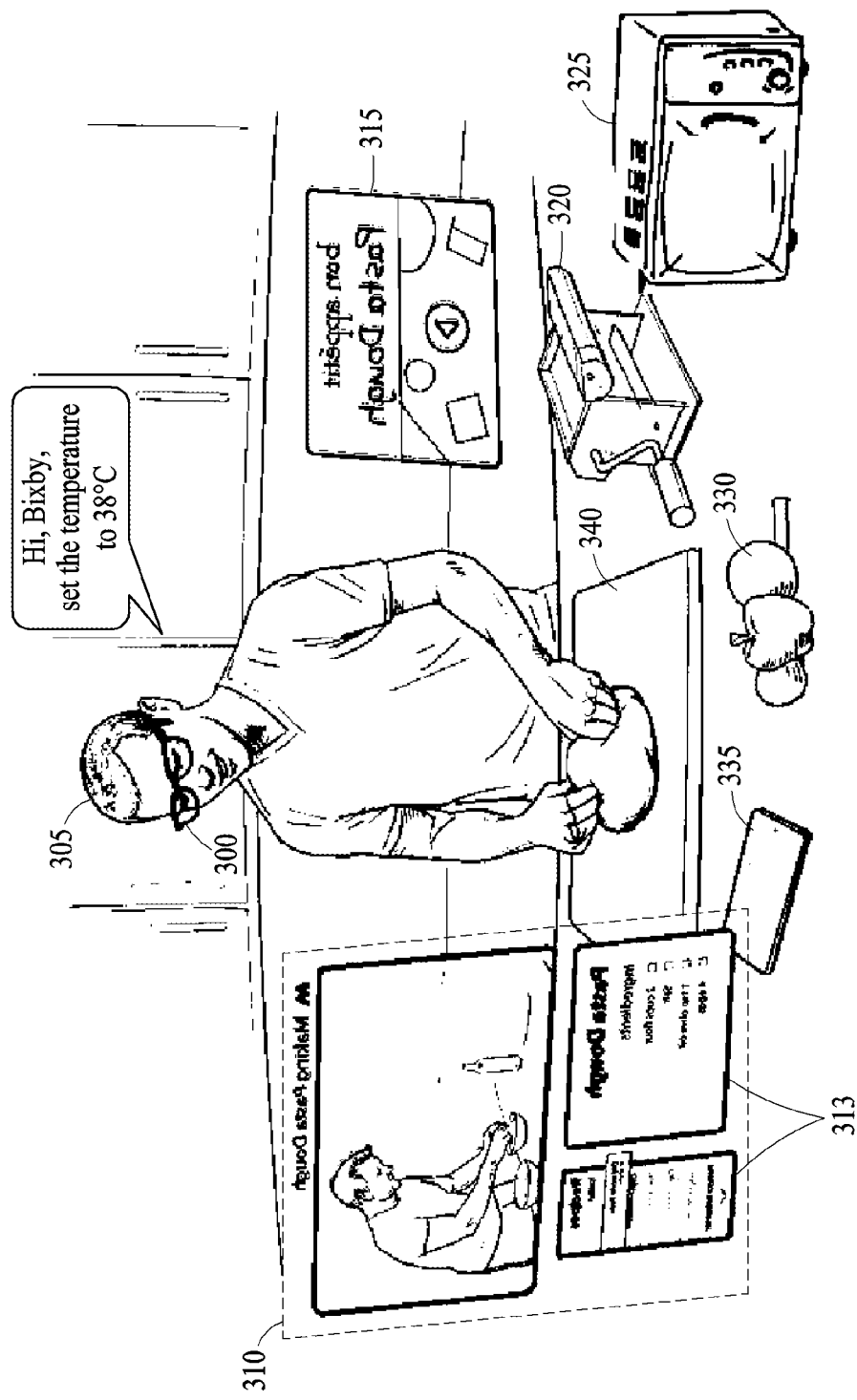
FIG. 3 illustrates an example voice command uttered by a user wearing an electronic device configured to control another electronic device using vision information according to an example embodiment.

FIG. 3 illustrates an example voice command uttered by a user wearing an electronic device configured to control another electronic device using vision information according to an example embodiment.

Referring to FIG. 3, according to an example embodiment, a user 305 may wear an electronic device 300 (e.g., the wearable device 200 of FIG. 2) and utter a voice command to control an electronic device nearby.

In an example embodiment, the electronic device 300 may display augmented reality (AR) contents 310 and 315 (e.g., a cooking recipe 313 and a cooking video), such as an image or text viewed by the user 305, through a display (e.g., the first display 205 and the second display 210 of FIG. 2) of the electronic device 300.

Around the user 305, there may be electronic devices (e.g., a smartphone 335 and an oven 325) that may be controlled remotely. The electronic device 300 and these electronic devices (e.g., the smartphone 335 and the oven 325) may be connected through wireless communication.

In an example embodiment, the electronic device 300 may provide the user 305 with a voice assistant service that performs a task or service for the user 305 based on a command or query. The user 305 may utter a voice command for controlling another electronic device. The electronic device 300 may receive such a user utterance through a voice input device such as a microphone (e.g., the first microphone 250a, the second microphone 250b, and the third microphone 250c of FIG. 2), determine an intent of the user utterance and determine a target device to be controlled, and control the determined target device according to the intent of the user utterance. A target device described herein may refer to an electronic device corresponding to a target to be controlled by a user through an utterance uttered by the user, and a user utterance described herein may refer to an utterance uttered by a user and may be also used simply as an utterance.

A user's intent as discussed herein simply refers to a determination of a user's intent—not an actual intent or mind-reading of a user. Actual user intent is not required herein. Thus, user's intent as used herein would cover a possible intent of a user.

For example, the user 305 may utter a voice command for controlling a temperature of the oven 325 and input the user utterance to the electronic device 300 through the voice input device, and the electronic device 300 may determine the oven 325 as the target device based on the input user utterance and transmit a control signal to the oven 325 to control the temperature of the oven 325.

A user utterance input to the electronic device 300 for controlling another electronic device may generally include information associated with a target device to be controlled. However, the user 305 may utter the user utterance with such target device information omitted, or the target device may not be specified by the user utterance. In this case, the electronic device 300 may not readily execute the command.

For example, as illustrated in FIG. 3, the user 305 may utter "Hi, Bixby, set the temperature to 38° C." to control the temperature of the oven 325. In this example, "Hi, Bixby" may be a command calling the voice assistant service provided in the electronic device 300, and the command calling the voice assistant service may be set in various ways. Although the user 305 utters "set the temperature to 38° C." with an intent of controlling the temperature of the oven 325, the user utterance itself may not include an "oven" which is the target device to be controlled, and thus the electronic device 300 may not be able to specify the target device only with the user utterance.

In an example embodiment, when the target device is not determined from the user utterance, the electronic device 300 controlling an electronic device using vision information may determine the target device using an image acquired through a camera configured to capture and acquire an image of an environment around the electronic device 300.

In an example embodiment, the electronic device 300 may recognize objects in an image acquired through the camera and determine the target device among the recognized objects. For example, as illustrated in FIG. 3, the electronic device 300 may recognize objects (e.g., a dough roller machine 320, the oven 325, apples 330, the smartphone 335, and a cutting board 340) included in an image acquired through the camera. The electronic device 300 may identify controllable devices (e.g., the oven 325 and the smartphone 335) among the recognized objects (e.g., the dough roller machine 320, the oven 325, the apples 330, the smartphone 335, and the cutting board 340). The controllable devices may be Internet of things (IoT) devices. The electronic device 300 may recognize objects from an image and identify controllable devices, using a deep learning model trained for object recognition and identification of controllable devices.

The electronic device 300 may determine, to be the target device to be controlled, the oven 325 of which the temperature is controllable from among the controllable devices (e.g., the oven 325 and the smartphone 335), and control the oven 325.

In an example embodiment, the target device may not be determined from an image acquired by the camera. For example, when the target device is not determined from the acquired image, the electronic device 300 may determine a space in which the user 305 is present, based on a rule-based database (DB) in which object information and spatial information are stored in a mapped form and on objects recognized in an image. When the space in which the user 305 is present is determined, the electronic device 300 may receive information associated with controllable devices corresponding to the space from an IoT server (not shown) (e.g., the server 108 of FIG. 1), and determine the target device based on such received controllable device information. The IoT server, which wirelessly communicates with the electronic device 300, may classify users using user accounts, and store one or more controllable devices that are registered for each user in the IoT server with space tags set by the users.

Hereinafter, a method of controlling an electronic device using vision information will be described in detail with reference to FIG. 4.

Figure 4:
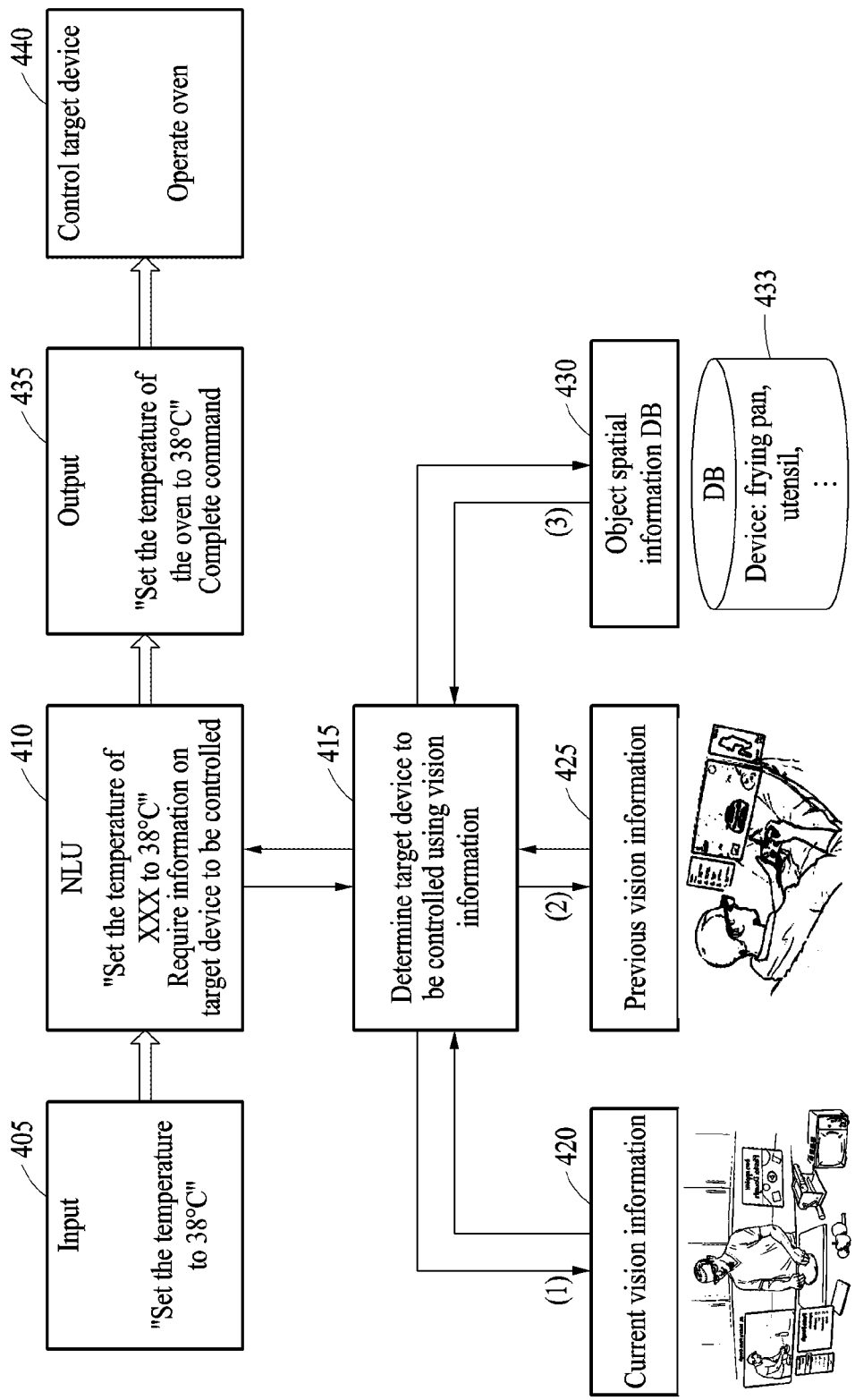
FIG. 4 is a diagram illustrating example operations performed by an electronic device to determine a target device to be controlled according to an example embodiment.

FIG. 4 is a diagram illustrating example operations performed by an electronic device to determine a target device to be controlled according to an example embodiment.

Referring to FIG. 4, in operation 405, the electronic device 300 may receive a user utterance "set the temperature to 38° C." In operation 410, the electronic device 300 may determine an intent of the user utterance by performing natural language understanding (NLU) on the received user utterance. However, when determining the intent of the user utterance "set the temperature 38° C.," the electronic device 300 may not be able to determine a target device which is a target for temperature control only with this user utterance, but determine that more information on the target device is required.

In operation 415, when the target device to be controlled is not determined in operation 410, the electronic device 300 may determine the target device using vision information. The vision information may include information associated with an image acquired by a camera of the electronic device 300, information associated with objects recognized in the image, and/or information associated with a space in the image.

In operation 420, the electronic device 300 may determine whether it is easily possible to determine the target device based on current vision information which is vision information after the input of the user utterance. In an example embodiment, the electronic device 300 may determine whether it is easily possible to determine the target device based on a current image acquired through the camera of the electronic device 300 for a first time period (e.g., 2 seconds) after a point in time at which the user utterance is input to a voice input device of the electronic device 300.

The electronic device 300 may acquire the current image of the first time period by capturing an image of an environment around the electronic device 300 using the camera and may recognize objects in the current image.

The electronic device 300 may identify one or more controllable devices among the objects recognized in the current image. When there is a controllable device corresponding to the intent determined in operation 410 among the identified controllable devices, the electronic device 300 may determine that it is possible to determine the target device. When it is possible to determine the target device from the current image, the electronic device 300 may determine a target device determined from the current image to be the target device corresponding to the intent determined in operation 410.

When there is no controllable device identified in the current image or when there is no controllable device corresponding to the intent determined in operation 410 among the controllable devices identified in the current image, the electronic device 300 may determine that it is not possible to determine the target device.

In another example embodiment, the electronic device 300 may determine the target device by tracking a gaze of the user through a gaze tracking camera (e.g., the second cameras 275a and 275b of FIG. 2). For example, when the gaze of the user lingers on a controllable device included in the current image for the first time period or greater, the electronic device 300 may determine the controllable device to be the target device.

In operation 425, when it is determined not to be possible to determine the target device in operation 420, the electronic device 300 may determine whether it is possible to determine the target device based on vision information before the input of the user utterance. The electronic device 300 may determine whether it is possible to determine the target device base on a previous image which is an image acquired through the camera of the electronic device 300 for a second time period (e.g., 1 minute) before the point in time at which the user utterance is input to the voice input device of the electronic device 300. The first time period and the second time period may be identical to or different from each other.

The electronic device 300 may identify one or more controllable devices from objects recognized in the previous image. When there is a controllable device corresponding to the intent determined in operation 410 among the identified controllable devices, the electronic device 300 may determine that it is possible to determine the target device. When it is possible to determine the target device from the previous image, the electronic device 300 may determine a target device determined from the previous image to be the target device corresponding to the intent determined in operation 410.

When there is no controllable device identified in the previous image or when there is no controllable device corresponding to the intent determined in operation 410 among the controllable devices identified in the previous image, the electronic device 300 may determine that it is not possible to determine the target device.

In operation 430, when it is determined not to be possible to determine the target device in operation 425, the electronic device 300 may determine a space in which the user is present based on a rule-based DB 433 in which object information and spatial information are stored in a mapped form, and determine whether it is possible to determine the target device from controllable device information associated with controllable devices corresponding to the space.

The electronic device 300 may determine the space in which the user is present based on objects recognized in the current image. Such an operation of determining the space in which the user is present may be performed using the rule-based DB 433. The object information associated with objects recognizable in the current image and the previous image may be stored in the rule-based DB 433 as being tagged as space tags respectively corresponding to the object information of the respective objects. A space tag described herein may refer to space-related information associated with a space tagged to object information associated with an object.

The DB 433 may be generated through learning of images acquired by the camera of the electronic device 300 through a deep learning model. For example, the electronic device 300 may acquire images of places of a house while the user is moving inside the house and recognize objects in the images. The electronic device 300 may generate and update the DB 433 by learning spaces in the captured images and object information associated with the objects recognized in the images.

In an example embodiment, there may be a plurality of space tags. The electronic device 300 may determine a space tag corresponding to the space in which the user is present based on space tags corresponding to objects included in an acquired image. For example, the DB 433 may store therein space tags respectively corresponding to a living room, a main room, and a kitchen, and a frying pan may be stored in the DB 433 as being tagged as a space tag corresponding to the kitchen among the space tags stored in the DB 433. For example, when the frying pan is recognized in the current image, the electronic device 300 may determine, to be the kitchen, the space tag corresponding to the space in which the user is present from the DB 433, based on the kitchen which is the space tag corresponding to the frying pan.

In an example embodiment, the electronic device 300 may request an IoT server (not shown) for controllable device information associated with a controllable device registered as the space tag corresponding to the space in which the user is present. The IoT server, which wirelessly communicates with the electronic device 300, may classify users using user accounts, and store controllable devices that are registered for each user in the IoT server as space tags set by the users.

For example, the user may set a space tag corresponding to a kitchen for an oven and register the space tag in the IoT server, and set a space tag corresponding to a living room for an air conditioner and a television (TV) and register the space tag in the IoT server. For example, when the space tag corresponding to the space in which the user is present is determined to be the kitchen, the electronic device 300 may request the IoT server for controllable device information associated with controllable devices corresponding the kitchen among controllable devices registered by the user. The IoT server may identify the user using a user account and provide the electronic device 300 with information associated with the oven corresponding to the kitchen among the controllable devices registered by the user.

When receiving the controllable device information associated with controllable devices corresponding to a space tag of the current image from the IoT server, the electronic device 300 may search for a controllable device corresponding to the intent determined in operation 410 and determine the retrieved controllable device to be the target device. For example, when an oven and a lamp are registered in association with a space tag corresponding to a kitchen in the IoT server, a controllable device corresponding to an intent of a voice command "set the temperature to 38° C." may be the oven, and the electronic device 300 may determine the oven to be the target device.

In an example embodiment, there may be a plurality of controllable devices corresponding to the space tag of the current image, and there may also be a plurality of controllable devices corresponding to the intent determined in operation 410 among the controllable devices corresponding to the space tag. For example, when an air conditioner and an oven are registered in the IoT server for a space tag corresponding to a kitchen, both the air conditioner and the oven may be a target for temperature control. When there are a plurality of controllable devices corresponding to the space tag of the current image and there are also a plurality of controllable devices corresponding to the intent determined in operation 410, the electronic device 300 may query the user about which one or more of the controllable devices is to be controlled, using at least one of a display of the electronic device 300 or a voice output device of the electronic device 300. When the user selects any one from among the controllable devices, the electronic device 300 may determine the selected controllable device to be the target device.

In operation 435, when the target device is determined, the electronic device 300 may complete the command. For example, the electronic device 300 may complete the voice command (e.g., "set the temperature to 38° C.") that is input with the target device information omitted to be a complete voice command (e.g., "set the temperature of the oven to 38° C.").

In operation 440, the electronic device 300 may control the target device according to the intent determined in operation 410. For example, in the example of FIG. 4, the electronic device 300 may control the temperature of the oven which is the target device to 38° C.

Hereinafter, a method of controlling an electronic device using vision information will be described in detail with reference to FIG. 5.

Figure 5:
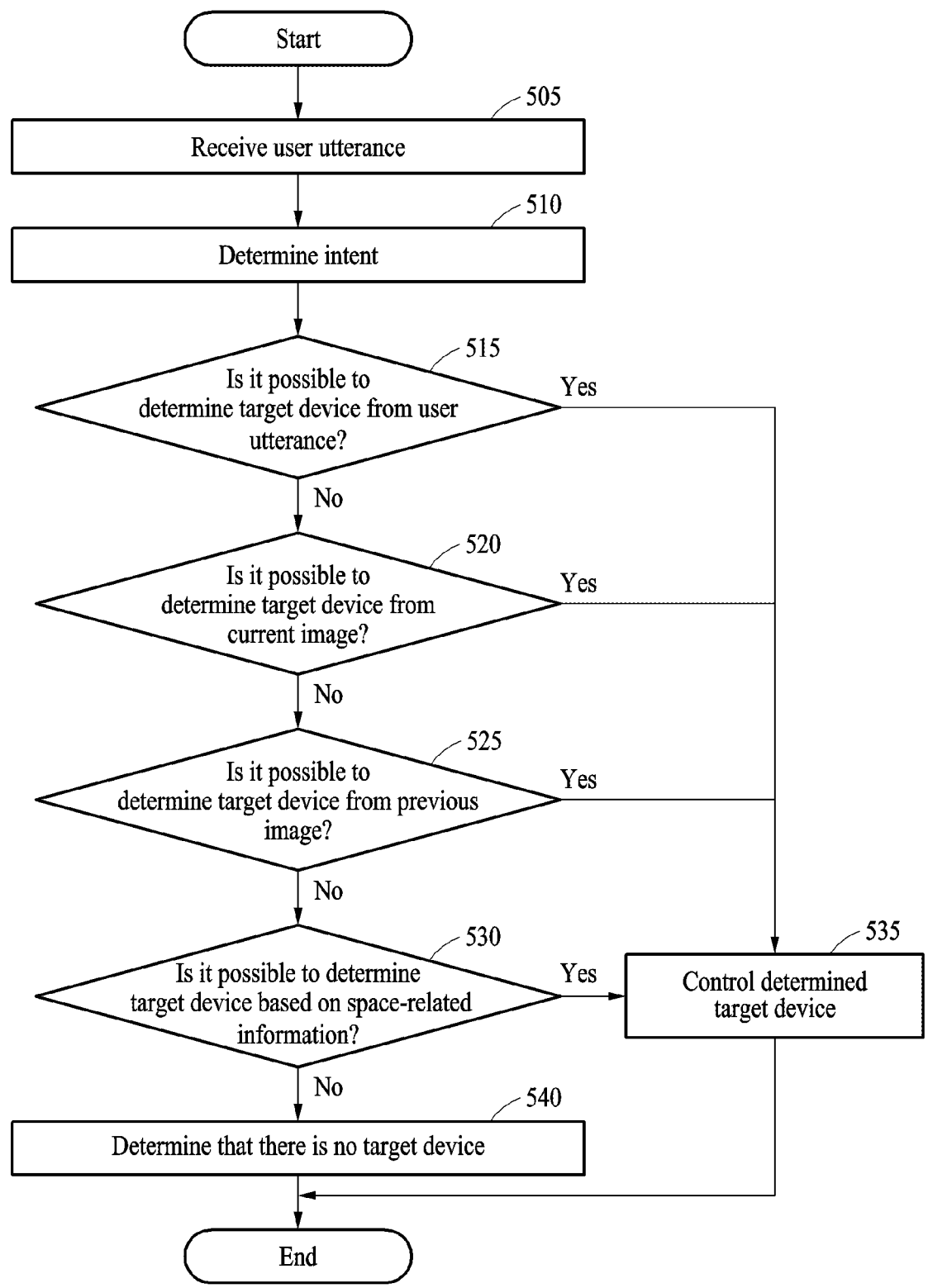
FIG. 5 is a flowchart illustrating an example method of controlling an electronic device using vision information according to an example embodiment.

FIG. 5 is a flowchart illustrating an example method of controlling an electronic device using vision information according to an example embodiment.

Referring to FIG. 5, in operation 505, the electronic device 300 may receive a user utterance through a voice input device of the electronic device 300. The voice input device may include a microphone, for example. In operation 510, the electronic device 300 may determine an intent of the user utterance by performing NLU on the received user utterance. For example, the electronic device 300 may include a natural language processing (NLP) module (not shown) for NLP on a user utterance. The NLP module may include an automated speech recognition (ASR) module (not shown) and an NLU module (not shown). The NLP module may generate text data from utterance data by performing speech recognition on the utterance data using the ASR module. The NLP module may identify a user's intent from the text data using the NPU module. For example, the NLP module may identify the intent corresponding to the user utterance by comparing the text data and each of a plurality of predefined intents.

The NLP module may extract additional information (e.g., target device information associated with a target device to be controlled) from the utterance data. For another example, the electronic device 300 may transmit the utterance data corresponding to the received user utterance to a server (e.g., the server 108 of FIG. 1) through the voice input device. The electronic device 300 may determine the intent of the user utterance based on a result of performing NLP in response to the utterance data received from the server. For example, the server may be the same server as an IoT server, or another server.

In operation 515, the electronic device 300 may determine whether it is possible to determine a target device to be controlled from the user utterance. When target device information associated with the target device is included in the user utterance, the electronic device 300 may determine the target device. However, when the user utters with the target device information omitted or the target device is not specified by the user utterance, the electronic device 300 may not readily perform a corresponding command.

When it is determined to be possible to determine the target device in operation 515 (e.g., Yes in operation 515), the electronic device 300 may determine a target device determined from the user utterance to be the target device corresponding to the intent determined in operation 510. In operation 535, when the target device is determined, the electronic device 300 may control the determined target device according to the intent determined in operation 510.

In operation 520, when it is determined not to be possible to determine the target device in operation 515 (e.g., No in operation 515), the electronic device 300 may determine whether it is possible to determine the target device based on a current image acquired through a camera of the electronic device 300 configured to capture an image of an environment around the electronic device 300. The current image may refer to an image acquired for a first time period after a point in time at which the user utterance is input to the voice input device.

In an example embodiment, the electronic device 300 may identify one or more controllable devices in the current image. The identification of controllable devices may be performed using a deep learning model. When there is a controllable device corresponding to the intent determined in operation 510 among the controllable devices identified in the current image, the electronic device 300 may determine that it is possible to determine the target device.

However, when there is no controllable device identified in the current image or there is no controllable device corresponding to the intent determined in operation 510 among the controllable devices identified in the current image, the electronic device 300 may determine that it is not possible to determine the target device.

When it is determined to be possible to determine the target device in operation 520 (e.g., Yes in operation 520), the electronic device 300 may determine a target device determined from the current image to be the target device corresponding to the intent determined in operation 510. In operation 535, when the target device is determined, the electronic device 300 may control the determined target device according to the intent determined in operation 510.

In operation 525, when it is determined not to be possible to determine the target device in operation 520 (e.g., No in operation 520), the electronic device 300 may determine whether it is possible to determine the target device based on a previous image acquired before the current image. The previous image may refer to an image acquired for a second time period before the point in time at which the user utterance is input to the voice input device.

In an example embodiment, the electronic device 300 may identify one or more controllable devices in the previous image. Such identification of controllable devices may be performed using a deep learning model. When there is a controllable device corresponding to the intent determined in operation 510 among the controllable devices identified in the previous image, the electronic device 300 may determine that it is possible to determine the target device.

However, when there is no controllable device identified in the previous image or there is no controllable device corresponding to the intent determined in operation 510 among the controllable devices identified in the previous image, the electronic device 300 may determine that it is not possible to determine the target device.

When it is determined to be possible to determine the target device in operation 525 (e.g., Yes in operation 525), the electronic device 300 may determine a target device determined from the previous image to be the target device corresponding to the intent determined in operation 510. In operation 535, when the target device is determined, the electronic device 300 may control the determined target device according to the intent determined in operation 510.

In operation 530, when it is determined not to be possible to determine the target device in operation 525 (e.g., No in operation 525), the electronic device 300 may determine space-related information associated with a space in which the user is present and determine whether it is possible to determine the target device based on the space-related information. In an example embodiment, the space-related information may be a space tag corresponding to the space in which the user is present. The space-related information may be determined based on spatial information corresponding to objects recognized in the current image and the previous image. The spatial information corresponding to the objects recognized in the current image and the previous image may be space tags attached to the objects recognized in the current image and the previous image.

In an example embodiment, the electronic device 300 may determine the space-related information corresponding to the space in which the user is present based on the rule-based database DB 433 in which object information associated with the objects and the spatial information are stored in a mapped form and on an image (e.g., the current image or the previous image), and determine whether it is possible to determine the target device from controllable device information associated with a controllable device corresponding to the determined space-related information.

When it is determined to be possible to determine the target device in operation 530 (e.g., Yes in operation 530), the electronic device 300 may determine a target device determined from the space-related information to be the target device corresponding to the intent determined in operation 510. In operation 535, when the target device is determined, the electronic device 300 may control the determined target device according to the intent determined in operation 510.

In operation 540, when it is determined not to be possible to determine the target device in operation 530 (e.g., No in operation 530), the electronic device 300 may determine that there is no target device to be controlled. In an example embodiment, when there is no target device to be controlled, the electronic device 300 may receive again a user utterance.

Hereinafter, operation 530 described above with reference to FIG. 5 will be described in greater detail with reference to FIG. 6.

Figure 6:
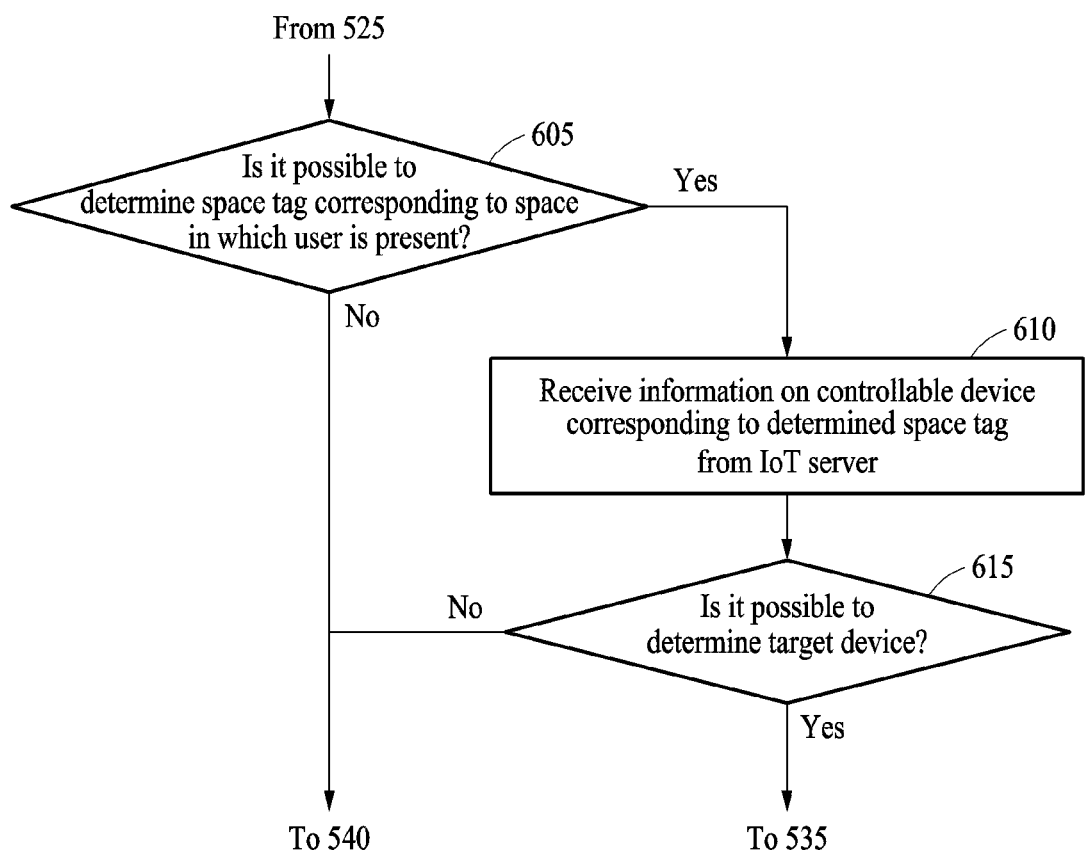
FIG. 6 is a flowchart illustrating an example flow of operations performed to determine a target device to be controlled based on space-related information according to an example embodiment.

FIG. 6 is a flowchart illustrating an example flow of operations performed to determine a target device to be controlled based on space-related information according to an example embodiment.

Referring to FIG. 6, in operation 605, when it is determined not to be possible to determine a target device to be controlled in operation 525, the electronic device 300 may determine whether it is possible to determine a space tag corresponding to a space in which a user is present.

In an example embodiment, the electronic device 300 may recognize objects in a current image. Such recognition of objects may be performed using a deep learning model provided in the electronic device 300. The electronic device 300 may determine whether it is possible to determine the space tag corresponding to the space in which the user is present, based on a space tag in the DB 433 corresponding to an object recognized in the current image. For example, when the space tag corresponding to the object recognized in the current image is stored in the DB 433, the electronic device 300 may determine that it is possible to determine the space tag corresponding to the space in which the user is present.

When there is no object recognized in the current image or there is no space tag stored in the DB 433 in association with an object recognized in the current image, the electronic device 300 may determine whether it is possible to determine the space tag corresponding to the space in which the user is present, based on a space tag in the DB 433 corresponding to an object recognized in a previous image. When the space tag corresponding to the object recognized in the previous image is stored in the DB 433, the electronic device 300 may determine that it is possible to determine the space tag corresponding to the space in which the user is present.

When there is no object recognized in the previous image or there is no space tag stored in the DB 433 in association with an object recognized in the previous image, the electronic device 300 may determine that it is not possible to determine the space tag corresponding to the space in which the user is present.

In another example embodiment, when there is no object recognized in the current image or when a space tag corresponding to an object recognized in the current image is not stored in the DB 433, the electronic device 300 may determine that it is not possible to determine the space tag corresponding to the space in which the user is present, without referring to a space tag corresponding to an object recognized in the previous image.

When it is determined not to be possible to determine the space tag corresponding to the space in which the user is present in operation 605 (e.g., No in operation 605), the electronic device 300 may determine that there is no target device to be controlled in operation 540. When there is no target device to be controlled, the electronic device 300 may receive again a user utterance from the user.

When it is determined to be possible to determine the space tag corresponding to the space in which the user is present in operation 605 (e.g., Yes in operation 605), the electronic device 300 may receive controllable device information associated with controllable devices registered as the space tag corresponding to the space in which the user is present, from an IoT server that stores therein controllable device information associated with controllable devices registered by setting space tags by the user, in operation 610.

In operation 615, the electronic device 300 may determine whether it is possible to determine the target device from the information received from the IoT server. When the information received from the IoT server includes a controllable device corresponding to an intent determined in operation 510, the electronic device 300 may determine that it is possible to determine the target device. When the information received from the IoT server does not include the controllable device corresponding to the intent determined in operation 510, the electronic device 300 may determine that it is not possible to determine the target device.

When the information received from the IoT server includes two or more controllable devices corresponding to the intent determined in operation 510, the electronic device 300 may query the user about which one of the controllable devices is to be controlled by using at least one of a display of the electronic device 300 or a voice output device of the electronic device 300. The electronic device 300 may receive a response from the user to the query and determine that it is possible to determine the target device when the user selects at least one from among the controllable devices.

When it is determined not to be possible to determine the target device in operation 615 (e.g., No in operation 615), the electronic device 300 may determine that there is no target device to be controlled in operation 540. When there is no target device to be controlled, the electronic device 300 may receive again a user utterance from the user.

In operation 535, when it is determined to be possible to determine the target device in operation 615 (e.g., Yes in operation 615), the electronic device 300 may control the determined target device according to the intent determined in operation 510.

Figure 7A:
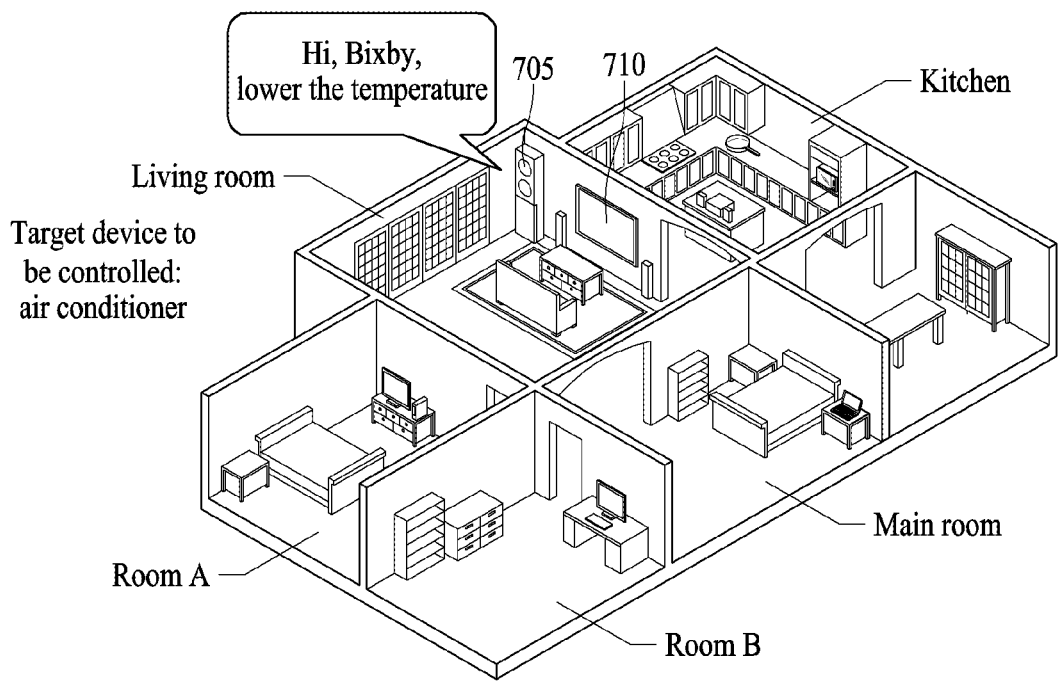
FIGS. 7A and 7B are diagrams illustrating examples of determining a target device to be controlled in different ways based on a location of a user according to an example embodiment.
Figure 7B:
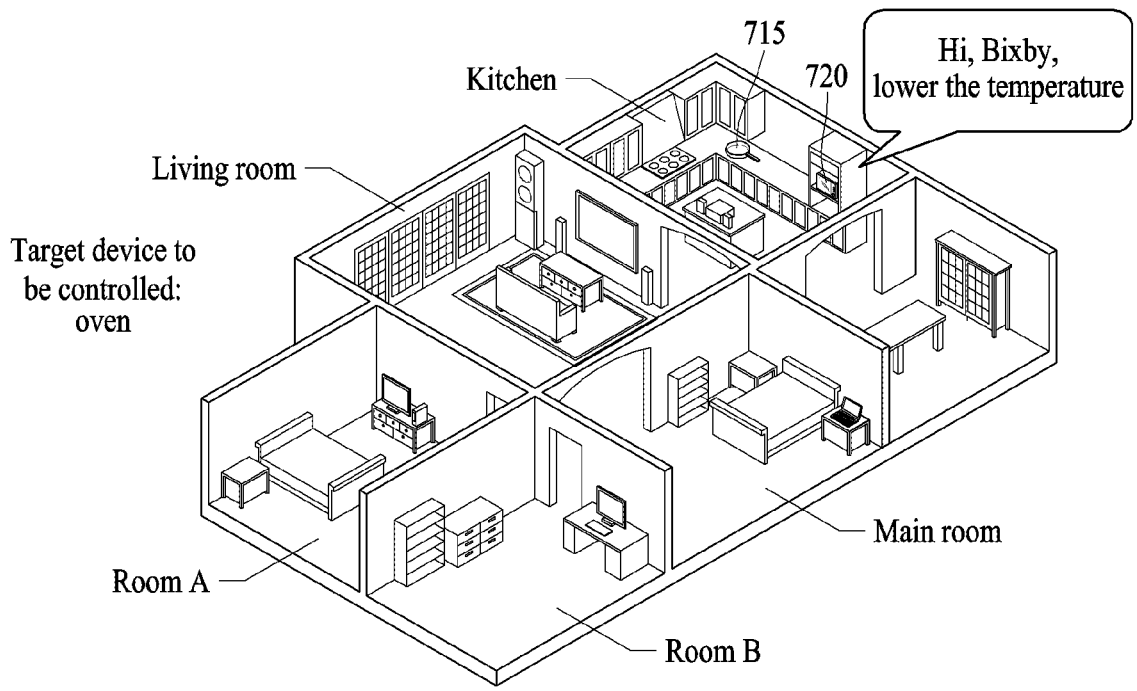

FIGS. 7A and 7B are diagrams illustrating examples of determining a target device to be controlled in different ways based on a location of a user according to an example embodiment.

Referring to FIGS. 7A and 7B, illustrated are an example structure of a house where a user (e.g., the user 305 of FIG. 3) resides and an example space where the user 305 utters a voice command "Hi, Bixby, lower the temperature." For example, the house of the user 305 may include a room A, a room B, a kitchen, a living room, and a main room. The user 305 may utter the voice command in the living room as illustrated in FIG. 7A, and the user 305 may utter the voice command in the kitchen as illustrated in FIG. 7B.

In the examples of FIGS. 7A and 7B, assumed is a situation where the electronic device 300 determines that it is not possible to determine a target device to be controlled after performing the operations (e.g., operations 505, 510, 515, 520, and 525) described above with reference to FIG. 5.

In the example of FIG. 7A, the electronic device 300 may recognize a TV 710 in a living room from a current image. In an example embodiment, the rule-based DB 433 may store therein respective space tags of the room A, the room B, the kitchen, the living room, and the main room, and object information associated with objects respectively corresponding to the space tags. For example, the rule-based DB 433 may store therein the living room as a space tag corresponding to the TV 710. In this example, the electronic device 300 may refer to the DB 433 and determine the living room which is the space tag corresponding to the TV 710 to be a space tag corresponding to the space in which the user 305 is present.

The user 305 may set the space tag of the living room for a controllable device, for example, the TV 710 and an air conditioner 705, and register the space tag in an IoT server. The electronic device 300 may receive, from the IoT server, information associated with the TV 710 and the air conditioner 705, as controllable device information associated with controllable electronic devices corresponding to the living room which is the space tag corresponding to the space in which the user 305 is present.

When receiving, from the IoT server, the information associated with the TV 710 and the air conditioner 705 as the controllable device information corresponding to the living room, the electronic device 300 may determine the air conditioner 705 from between the TV 710 and the air conditioner 705 to be a target device to be controlled that corresponds to an intent of the user utterance "Hi, Bixby, lower the temperature."

In the example of FIG. 7B, the electronic device 300 may recognize a frying pan 715 in the kitchen from a current image. For example, the rule-based DB 433 may store therein the kitchen as a space tag corresponding to the frying pan 715. In this example, the electronic device 300 may determine the kitchen which is the space tag corresponding to the frying pan 715 to be a space tag corresponding to the space in which the user 305 is present.

The user 305 may set the space tag of the kitchen for a controllable device such as an oven (e.g., an oven 720), and register the space tag in the IoT server. The electronic device 300 may receive, from the IoT server, information associated with the oven 720 as controllable device information associated with controllable electronic devices corresponding to the kitchen which is the space tag corresponding to the space in which the user 305 is present.

When receiving, from the IoT server, the information associated with the oven 720 as the controllable device information corresponding to the kitchen, the electronic device 300 may determine the oven 720 to be a target device to be controlled that corresponds to an intent of the user utterance "Hi, Bixby, lower the temperature."

Figure 8:
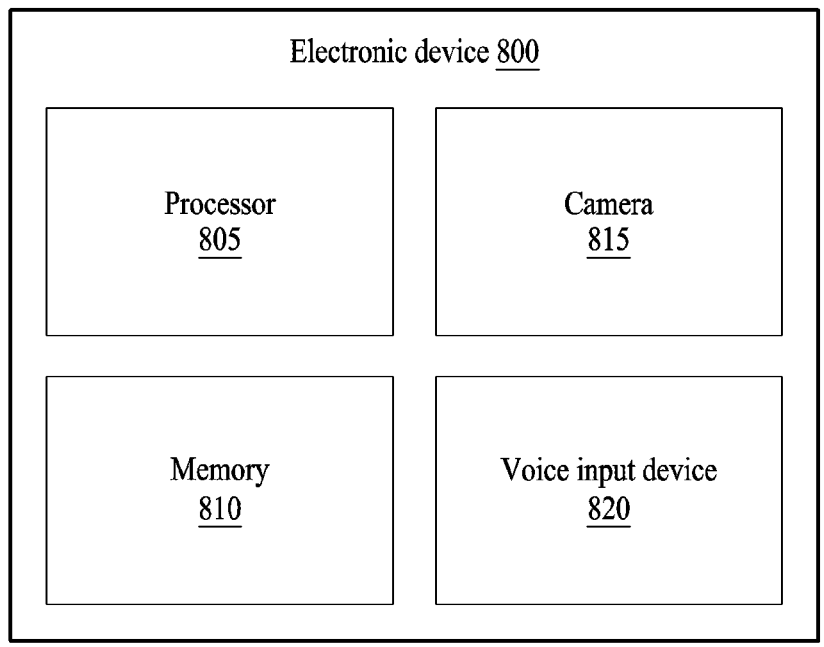
FIG. 8 is a block diagram illustrating an example configuration of an electronic device according to an example embodiment.

FIG. 8 is a block diagram illustrating an example configuration of an electronic device according to an example embodiment.

Referring to FIG. 8, an electronic device 800 (e.g., the electronic device 101 of FIG. 1 or the electronic device 300 of FIG. 3) may include a camera 815 configured to capture an image of an environment around the electronic device 800 and acquire a current image, a voice input device 820 configured to receive a user utterance, a processor 805, and/or at least one memory 810 configured to store therein instructions to be executed by the processor 805. In an example embodiment, the electronic device 800 may be a wearable electronic device. In an example embodiment, the memory 810 may include a rule-based DB (not shown) (e.g., the DB 433 of FIG. 4) that stores therein object information associated with objects recognizable in an image captured by the camera 815 and one or more space tags corresponding to the object information.

In an example embodiment, when the instructions stored in the memory 810 are executed by the processor 805, the processor 805 may perform NLU on a user utterance received from a user and determine an intent of the user utterance. Each "processor" herein comprises processing circuitry.

The processor 805 may determine whether it is possible to determine a target device to be controlled from the user utterance. When the user utterance includes target device information associated with the target device, the processor 805 may determine the target device. However, when the user utters with the target device information omitted or when the target device is not specified by the user utterance, the processor 805 may not readily perform a corresponding command.

When it is possible to determine the target device from the user utterance, the processor 805 may determine a target device determined from the user utterance to be the target device corresponding to the determined intent of the user utterance. When the target device is determined, the processor 805 may control the determined target device according to the determined intent of the user utterance. For example, the processor 805 may transmit control data based on the determined intent of the user utterance to the target device through a network (e.g., the first network 198 or the second network 199 of FIG. 1), and set or control the target device to operate according to the control data. For another example, the processor 805 may transmit the control data based on the determined intent of the user utterance to an IoT server through a network. The IoT server may transmit the control data received from the electronic device 800 to the target device and set the target device to operate according to the control data.

When it is not possible to determine the target device from the user utterance, the processor 805 may determine whether it is possible to determine the target device based on a current image acquired through the camera 815 configured to capture an image of an environment around the electronic device 800. The current image may refer to an image acquired for a first time period after a point in time at which the user utterance is input to the voice input device 820.

In an example embodiment, the processor 805 may identify one or more controllable devices in the current image. Such identification of controllable devices may be performed using a deep learning model. When there is a controllable device corresponding to the determined intent of the user utterance among the controllable devices identified in the current image, the processor 805 may determine that it is possible to determine the target device.

However, when there is no controllable device identified in the current image or when there is no controllable device corresponding to the determined intent of the user utterance among the controllable devices identified in the current image, the processor 805 may determine that it is not possible to determine the target device.

When it is possible to determine the target device from the current image, the processor 805 may determine a target device determined from the current image to be the target device corresponding to the determined intent of the user utterance. When the target device is determined, the processor 805 may control the determined target device according to the determined intent of the user utterance.

When it is not possible to determine the target device from the current image, the processor 805 may determine whether it is possible to determine the target device based on a previous image acquired before the current image. The previous image may refer to an image acquired for a second time period before the point in time at which the user utterance is input to the voice input device 820.

In an example embodiment, the processor 805 may identify one or more controllable devices in the previous image. Such identification of controllable devices may be performed using a deep learning model. When there is a controllable device corresponding to the determined intent of the user utterance among the controllable devices identified in the previous image, the processor 805 may determine that it is possible to determine the target device.

However, when there is no controllable device identified in the previous image or when there is no controllable device corresponding to the determined intent of the user utterance among the controllable devices identified in the previous image, the processor 805 may determine that it is not possible to determine the target device.

When it is possible to determine the target device from the previous image, the processor 805 may determine a target device determined from the previous image to be the target device corresponding to the determined intent of the user utterance. When the target device is determined, the processor 805 may control the determined target device according to the determined intent of the user utterance.

When it is not possible to determine the target device from the previous image, the processor 805 may determine whether it is possible to determine a space tag corresponding to a space in which the user is present.

In an example embodiment, the processor 805 may recognize objects in the current image. Such object recognition may be performed using a deep learning model. The processor 805 may determine whether it is possible to determine the space tag corresponding to the space in which the user is present based on space tags in the DB corresponding to the objects recognized in the current image. For a detailed description of the DB, reference may be made to what has been described above with reference to FIGS. 4 through 6, and a more detailed and repeated description of the DB will be omitted here for brevity.

When a space tag corresponding to an object recognized in the current image is stored in the DB, the processor 805 may determine that it is possible to determine the space tag corresponding to the space in which the user is present.

When there is no object recognized in the current image or when there is no space tag stored in the DB in association with an object recognized in the current image, the processor 805 may determine whether it is possible to determine the space tag corresponding to the space in which the user is present, based on space tags in the DB corresponding to objects recognized in the previous image. When there is a space tag corresponding to an object recognized in the previous image is stored in the DB, the processor 805 may determine that it is possible to determine the space tag corresponding to the space in which the user is present.

When there is no object recognized in the previous image or when there is no space tag stored in the DB in association with an object recognized in the previous image, the processor 805 may determine that it is not possible to determine the space tag corresponding to the space in which the user is present.

When it is not possible to determine the space tag corresponding to the space in which the user is present, the processor 805 may determine that there is no target device to be controlled. When there is no target device to be controlled, the processor 805 may receive again a user utterance.

When it is possible to determine the space tag corresponding to the space in which the user is present, the processor 805 may receive information associated with a controllable device registered as the space tag corresponding to the space in which the user is present, from an IoT server that stores therein controllable device information associated with controllable devices registered by setting space tags by the user.

The processor 805 may determine whether it is possible to determine the target device from the information received from the IoT server. When the information received from the IoT server includes a controllable device corresponding to the determined intent of the user utterance, the processor 805 may determine that it is possible to determine the target device to be controlled. When the information received from the IoT server does not include the controllable device corresponding to the determined intent of the user utterance, the processor 805 may determine that it is not possible to determine the target device.

When the information received from the IoT server includes two or more controllable devices corresponding to the determined intent of the user utterance, the processor 805 may query the user about which one of the two or more controllable devices is to be controlled by using at least one of a display (not shown) or a voice output device (not shown) of the electronic device 800. The processor 805 may receive a response from the user to the query and may determine that it is possible to determine the target device when the user selects any one from among the two or more controllable devices.

When it is not possible to determine the target device from the information received from the IoT server, the processor 805 may determine that there is no target device to be controlled. When there is no target device, the processor 805 may receive again a user utterance.

When it is possible to determine the target device from the information received from the IoT server, the processor 805 may control the determined target device according to the determined intent of the user utterance.

Figure 9:
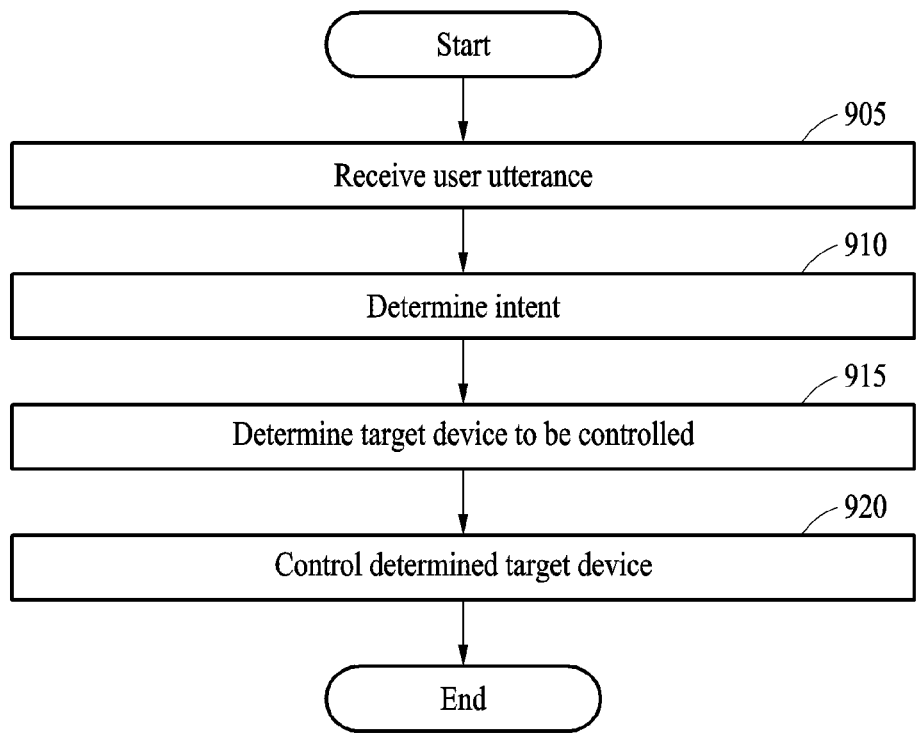
FIG. 9 is a flowchart illustrating an example method of controlling an electronic device using vision information according to an example embodiment.

FIG. 9 is a flowchart illustrating an example method of controlling an electronic device using vision information according to an example embodiment.

Referring to FIG. 9, a method of controlling an electronic device using vision information may include: operation 905 of receiving a user utterance through the voice input device 820 of the electronic device 800 (e.g., a wearable electronic device); operation 910 of determining a user's intent based on the received user utterance; operation 915 of determining a target device to be controlled corresponding to the determined intent; and operation 920 of controlling the determined target device according to the determined intent. Operation 915 of determining the target device may include: determining whether it is possible to determine the target device from the user utterance; and when it is not possible to determine the target device from the user utterance, determining whether it is possible to determine the target device based on a current image acquired through the camera 815 that acquires the current image by capturing an image of an environment around the electronic device 800.

Operation 915 of determining the target device may include: when it is possible to determine the target device from the current image, determining a target device determined from the current image to be the target device corresponding to the determined intent.

The determining whether it is possible to determine the target device based on the current image may include: identifying one or more controllable devices in the current image; and when there is a controllable device corresponding to the determined intent among the identified controllable devices, determining that it is possible to determine the target device.

Operation 915 of determining the target device may further include: when it is not possible to determine the target device from the current image, determining whether it is possible to determine the target device based on one or more controllable devices identified in a previous image acquired before the current image.

Operation 915 of determining the target device may further include: when it is not possible to determine the target device from among the controllable devices identified in the previous image, determining whether it is possible to determine a space tag corresponding to a space in which a user is present from among one or more space tags stored in a DB that stores object information associated with recognizable objects in the current image and the previous image and one or more space tags corresponding to the object information; when it is possible to determine the space tag, receiving information associated with a controllable device registered as the space tag corresponding to the space in which the user is present, from an IoT server that stores controllable device information associated with controllable devices set as space tags by the user; and when the information received from the IoT server includes a controllable device corresponding to the determined intent, determining that it is possible to determine the target device to be controlled.

The determining that it is possible to determine the target device may further include: when the information received from the IoT server includes two or more controllable devices corresponding to the determined intent, querying the user about which one of the controllable devices is to be controlled, using at least one of a display and a voice output device of the electronic device 800.

The determining whether it is possible to determine the space tag may include: recognizing objects in the current image; and determining the space tag corresponding to the space in which the user is present based on a space tag in the DB corresponding to an object recognized in the current image.

According to an example embodiment, an electronic device (e.g., 800) that controls an electronic device using vision information may include: a camera (e.g., 815) configured to capture an image of an environment around the electronic device 800 and acquire a current image; a voice input device (e.g., 820) configured to receive a user utterance from a user; a processor (e.g., 805); and at least one memory (e.g., 810) storing therein instructions to be executed by the processor 805. When the instructions are executed by the processor 805, the processor 805 may perform an operation of determining a user's intent based on the received user utterance, an operation of determining a target device to be controlled corresponding to the determined intent, and an operation of controlling the determined target device according to the determined intent. The operation of determining the target device may include: determining whether it is possible to determine the target device from the user utterance; and when it is not possible to determine the target device from the user utterance, determining whether it is possible to determine the target device based on a current image acquired through the camera 815.

The operation of determining the target device may include: when it is possible to determine the target device from the current image, determining a target device determined from the current image to be the target device corresponding to the determined intent.

The determining whether it is possible to determine the target device based on the current image may include: identifying one or more controllable devices in the current image; and when there is a controllable device corresponding to the determined intent among the identified controllable devices, determining that it is possible to determine the target device to be controlled.

The operation of determining the target device may further include: when it is not possible to determine the target device from the current image, determining whether it is possible to determine the target device based on one or more controllable devices identified in a previous image acquired before the current image. "Based on" as used herein covers based at least on.

The memory 810 may store therein a DB that stores therein object information associated with recognizable objects in the current image and the previous image and one or more space tags corresponding to the object information. In this case, the operation of determining the target device may further include: when it is not possible to determine the target device from the controllable devices identified in the previous image, determining whether it is possible to determine a space tag corresponding to a space in which the user is present from among the one or more space tags stored in the DB.

The operation of determining the target device may further include: when it is possible to determine the space tag, receiving information associated with a controllable device registered as the space tag corresponding to the space in which the user is present, from an IoT server that stores therein controllable device information associated with controllable devices registered as space tags set by the user; and when the information received from the IoT server includes a controllable device corresponding to the determined intent, determining that it is possible to determine the target device to be controlled.

The determining that it is possible to determine the target device may further include: when the information received from the IoT server includes two or more controllable devices corresponding to the determined intent, querying the user about which one of the controllable devices is to be controlled, by using at least one of a display or a voice output device of the electronic device 800.

The current image may be an image acquired for a first time period after a point in time at which the user utterance is input to the voice input device 820.

The previous image may be an image acquired for a second time period before the point in time at which the user utterance is input to the voice input device 820.

The determining whether it is possible to determine the space tag may include: recognizing an object in the current image; and determining whether it is possible to determine the space tag corresponding to the space in which the user is present based on a space tag in the DB corresponding to the object recognized in the current image.

The determining whether it is possible to determine the space tag may include: when there is no object recognized in the current image, determining whether it is possible to determine the space tag corresponding to the space in which the user is present based on a space tag in the DB corresponding to an object recognized in the previous image.

The identifying of the controllable devices in the current image may be performed using a deep learning model.

According to various example embodiments described herein, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be appreciated that various example embodiments of the present disclosure and the terms used therein are not intended to limit the technological features set forth herein to particular embodiments and include various changes, equivalents, or replacements for a corresponding example embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a complier or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to various example embodiments, a method according to an example embodiment may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a camera configured to acquire a current image by capturing an image of an environment around the electronic device;
a voice input device, comprising circuitry, configured to receive a user utterance from a user;
a processor; and
at least one memory configured to store therein instructions to be executed by the processor,
wherein the processor is configured to, upon execution of the instructions:
determine a user's intent based on the received user utterance;
determine a target device to be controlled corresponding to the determined intent; and
control the determined target device based on the determined intent, wherein, to determine the target device, the processor is further configured to:
determine whether it is possible to determine the target device from the user utterance; and
when it is not possible to determine the target device from the user utterance, determine whether it is possible to determine the target device based on the current image acquired through the camera,
the electronic device is worn on a face of the user and provides the user with an image associated with an augmented reality (AR) and/or virtual reality (VR) service,
wherein the processor is further configured to:
when it is possible to determine the target device based on the current image, identify one or more controllable devices among objects recognized in the current image,
track a gaze of the user using a gaze tracking camera comprised in the electronic device, and
when it is determined that the gaze of the user lingers on a particular controllable device included in the current image for a predefined time period or greater, determine the particular controllable device to be the target device corresponding to the determined intent,
wherein, to determine the target device, the processor is further configured to:
when it is not possible to determine the target device based on the current image, determine whether it is possible to determine the target device based on one or more controllable devices identified in a previous image acquired before the current image,
wherein the memory is configured to:
store therein a database (DB) storing object information associated with recognizable objects in the current image and the previous image and one or more space tags corresponding to the object information,
wherein, to determine the target device, the processor is further configured to:
when it is not possible to determine the target device from the controllable devices identified in the previous image, determine whether it is possible to determine a space tag corresponding to a space in which the user is present among the space tags stored in the DB,
wherein, to determine whether it is possible to determine the space tag, the processor is further configured to:
recognize an object in the current image; and
determine whether it is possible to determine the space tag corresponding to the space in which the user is present, based on a space tag in the DB corresponding to the object recognized in the current image,
wherein, to determine whether it is possible to determine the space tag, the processor is further configured to:
when there is no object recognized in the current image, determine whether it is possible to determine the space tag corresponding to the space in which the user is present, based on a space tag in the DB corresponding to an object recognized in the previous image,
wherein, to determine the target device, the processor is further configured to:
when it is possible to determine the space tag, receive information associated with a controllable device registered as the space tag corresponding to the space in which the user is present, from an Internet of things (IoT) server storing therein controllable device information associated with controllable devices registered as space tags set by the user; and when the information received from the IoT server comprises a controllable device corresponding to the determined intent, determine that it is possible to determine the target device.

2. The electronic device of claim 1, wherein, to determine whether it is possible to determine the target device based on the current image, the processor is further configured to:

when there is a controllable device corresponding to the determined intent among the identified one or more controllable devices, determine that it is possible to determine the target device.

3. The electronic device of claim 1, wherein, to determine that it is possible to determine the target device, the processor is further configured to:

when the information received from the IoT server comprises two or more controllable devices corresponding to the determined intent, query the user about which at least one of the controllable devices is to be controlled using at least one of a display of the electronic device and/or a voice output device of the electronic device.

4. The electronic device of claim 1, wherein the current image is an image acquired for a first time period after a point in time at which the user utterance is input to the voice input device.

5. The electronic device of claim 1, wherein the previous image is an image acquired for a second time period before a point in time at which the user utterance is input to the voice input device.

6. The electronic device of claim 1, wherein the processor is further configured to:

identify the one or more controllable devices in the current image using a deep learning model.

7. A method of controlling an electronic device using vision information, the method comprising:

receiving a user utterance from a user through a voice input to a wearable electronic device;

determining a user's intent based on the received user utterance;

determining a target device to be controlled corresponding to the determined intent; and controlling the determined target device according to the determined intent, wherein the determining of the target device comprises:

determining whether it is possible to determine the target device from the user utterance; and identifying that it is not possible to determine the target device from the user utterance, and responsive thereto determining whether it is possible to determine the target device based on a current image acquired through a camera configured to acquire the current image by capturing an image of an environment around the wearable electronic device, the electronic device is worn on a face of the user and provides the user with an image associated with an augmented reality (AR) and/or virtual reality (VR) service, wherein the determining of the target device further comprises:

identifying that it is possible to determine the target device based on the current image, and responsive thereto identifying one or more controllable devices among objects recognized in the current image, tracking a gaze of the user using a gaze tracking camera comprised in the electronic device, and identifying that the gaze of the user lingers on a particular controllable device included in the current image for a predefined time period or greater, and responsive thereto determining the particular controllable device to be the target device corresponding to the determined intent, wherein the determining of the target device further comprises:

identifying that it is not possible to determine the target device based on a second current image acquired through the camera configured to acquire the second current image by capturing the second image of an environment around the wearable electronic device, and responsive thereto determining whether it is possible to determine the target device based on one or more controllable devices identified in a previous image acquired before the second current image, identifying that it is not possible to determine the targe device from the controllable devices identified in the previous image, and responsive thereto determining whether it is possible to determine a space tag corresponding to a space in which the user is present among one or more space tags stored in a database (DB) configured to store therein object information associated with recognizable objects in the second current image and the previous image and one or more space tags corresponding to the object information;

identifying that it is possible to determine the space tag, and responsive thereto receiving information associated with a controllable device registered as the space tag corresponding to the space in which the user is present, from an Internet of things (IoT) server storing therein controllable device information associated with controllable devices registered as space tags set by the user; and identifying that the information received from the IoT server comprises a controllable device corresponding to the determined intent, and responsive thereto determining that it is possible to determine the target device, wherein the determining whether it is possible to determine the space tag comprises:

recognizing an object in the second current image;

identifying that it is possible to determine the space tag corresponding to the space in which the user is present, based on a space tag in the DB corresponding to the recognized object in the second current image; and identifying that there is no object recognized in the second current image, and responsive thereto determining whether it is possible to determine the space tag corresponding to the space in which the user is present, based on a space tag in the DB corresponding to an object recognized in the previous image.

8. The method of claim 7, wherein the determining whether it is possible to determine the target device based on the current image comprises:

when there is a controllable device corresponding to the determined intent among the identified one or more controllable devices, determining that it is possible to determine the target device.

9. The method of claim 7, wherein the determining that it is possible to determine the target device comprises:

when the information received from the IoT server comprises two or more controllable devices corresponding to the determined intent, querying the user about which at least one of the controllable devices is to be controlled using at least one of a display of the electronic device and/or a voice output device of the electronic device.

10. A non-transitory computer-readable storage medium storing instructions that, when executed by a processor, are configured to cause the processor to perform the method of claim 7.

\* \* \* \* \*